J. L. FATE.
METHOD OF SEALING VACUUM JACKETS.
APPLICATION FILED MAY 3, 1909.
930,950.
Patented Aug. 10, 1909.
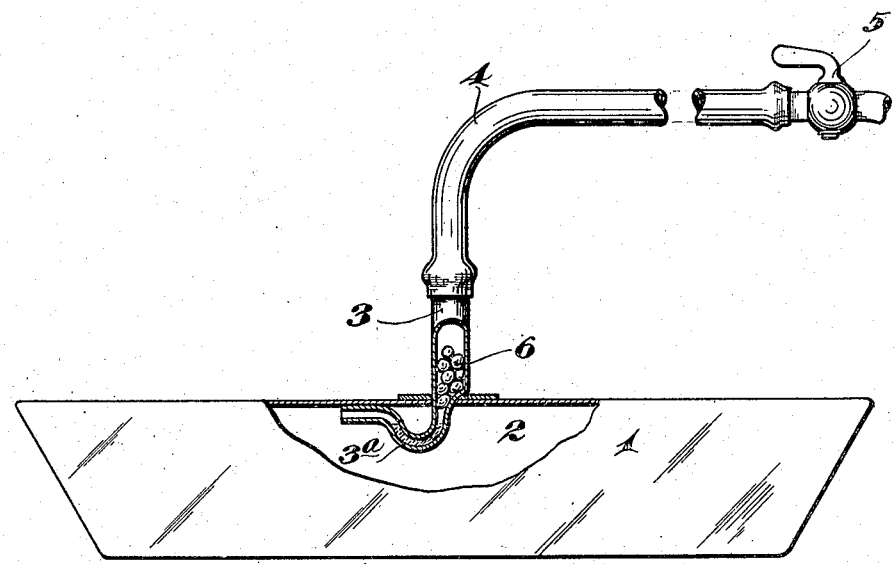
Witnesses:
L. L. Simpson,
A. H. Opsahl.
Inventor:
John L. Fate
By his Attorneys:
Williamson & Merchant

UNITED STATES PATENT OFFICE.

JOHN LAMPSON FATE, OF CHICAGO, ILLINOIS, ASSIGNOR TO AMERICAN INSULATING COMPANY, A CORPORATION OF MAINE.

METHOD OF SEALING VACUUM-JACKETS.

No. 930,950.  Specification of Letters Patent.  Patented Aug. 10, 1909.

Application filed May 3, 1909. Serial No. 493,523.

*To all whom it may concern:*

Be it known that I, JOHN LAMPSON FATE, a citizen of the United States, residing at Chicago, in the county of Cook and State of Illinois, have invented certain new and useful Improvements in Methods of Sealing Vacuum-Jackets; and I do hereby declare the following to be a full, clear, and exact description of the invention, such as will enable others skilled in the art to which it appertains to make and use the same.

My invention has for its object to provide an effective method for exhausting and sealing vacuum jackets.

To this end, the novel process consists in exhausting the air from the jacket through a conduit containing a fusible material, through which the air can be drawn by the exhausting pump, and then in fusing said material and allowing the same to solidify in said conduit while maintaining a vacuum on each side thereof.

The accompanying drawings illustrate a vacuum jacket which is to be sealed in accordance with this novel process or method.

In said drawing, the numeral 1 represents a hollow body or jacket adapted to afford a vacuum chamber 2 when the air is exhausted therefrom.

The numeral 3 represents the exhausting and sealing conduit or nipple which is seated in one wall of the jacket 1 and brazed air tight thereto.

The numeral 4 represents a hose or pipe section connected with an exhausting pump not shown and provided with a stop cock or valve 5. The hose 4 is adapted to be applied to the projecting end of the nipple 3 with an air tight joint. The nipple 3 is of such shape as to afford a sealing trap 3ª therein below the outer or projecting part of the nipple. The projecting part of the nipple is adapted to be loaded with particles of solder or other fusible material 6, through which the air can be drawn under the action of the pump. The nipple is sufficiently contracted at or near the junction of the trap portion thereof with the projecting part of the nipple to prevent the particles of fusible material 6 from passing on down into the trap. This material is preferably in the form of shot-like pellets which will lodge at the top of the trap, as shown by the full lines in the drawing. After the nipple has thus been loaded with the pellets of fusible material 6, the pump hose is applied to the projecting end of the nipple and the pump is kept in action until all the air possible has been exhausted from the chamber 2 of the jacket 1. Then the valve 5 in the pump pipe is turned into its closed position so as to maintain the vacuum on both sides of the pellets of fusible material 6 within the sealing nipple 3. Then by a blow pipe or other suitable means, heat is applied to that portion of the nipple 3 containing the pellets of fusible material 6, and under the action thereof this material will melt and flow down into the sealing trap 3ª and there solidify and operate to seal the vacuum chamber. It is obvious that this sealing is done within the nipple 3 while the vacuum is maintained on both sides thereof and, for this reason, the sealing is effective; or otherwise stated, there is no chance for air to pass back from the atmosphere through the pump, pipe 4 and nipple 3 into the vacuum chamber 2 while the sealing is being done. After the fusible material has been fused and the sealing completed as above described, the projecting end of the nipple is cut off and the jacket is ready for use. By actual and extensive use of this process, I have demonstrated that with a good pump I can secure and seal a ninety-eight per cent. of vacuum: and that the sealing so effected will be permanent; or otherwise stated, if the vacuum is ever broken it will break at some other place than at the solidified fusible material in the sealing nipple.

It is not absolutely necessary that the sealing nipple should be shaped to afford a trap. All that is necessary is that it should be so shaped that its projecting portion is adapted to be loaded with the particles of fusible material, through which the air can be drawn, and that the shape of the nipple will cause this material to lodge and to accumulate when fused so as to solidify and seal the passage in the nipple, and thereby hermetically seal the vacuum chamber. For example, the nipple may be of the shape disclosed in my pending application S. N. 318,639, filed May 25, 1906, wherein this method was first disclosed by me and of which case this application is intended to be a division.

What I claim is:

The method of exhausting and sealing vacuum jackets which consists in exhausting the air from the jacket through a conduit loaded with particles of fusible material through which the air can be drawn by the exhausting pump and then in fusing said material and allowing the same to solidify in said conduit while maintaining a vacuum on each side thereof, substantially as described.

In testimony whereof I affix my signature in presence of two witnesses.

JOHN LAMPSON FATE.

Witnesses:
H. COHEN,
K. BUGNER.